(12) United States Patent
Wobben

(10) Patent No.: US 7,514,808 B2
(45) Date of Patent: Apr. 7, 2009

(54) REGENERATIVE ENERGY SYSTEM

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 11/662,966

(22) PCT Filed: Sep. 22, 2005

(86) PCT No.: PCT/EP2005/054743

§ 371 (c)(1),
(2), (4) Date: Sep. 20, 2007

(87) PCT Pub. No.: WO2006/032685

PCT Pub. Date: Mar. 30, 2006

(65) Prior Publication Data

US 2008/0048452 A1    Feb. 28, 2008

(30) Foreign Application Priority Data

Sep. 24, 2004    (DE)    ......................... 10 2004 046 701

(51) Int. Cl.
*F03D 9/00* (2006.01)
(52) U.S. Cl. ................. 290/41; 290/40 A; 290/40 B; 290/40 C; 322/10; 322/11
(58) Field of Classification Search ............... 290/41, 290/40 A, 40 B, 40 C, 40, 30; 322/10, 11
See application file for complete search history.

(56) References Cited

U.S. PATENT DOCUMENTS 2,180,206 A    11/1939    Honnef (Continued)

FOREIGN PATENT DOCUMENTS

CN    1616601 A    5/2005

(Continued)

OTHER PUBLICATIONS

Bindner, H. et al., "Increasing the Technical and Economic Performance of Wind Diesel Systems by Including Fresh Water Production," Renewable Energy 9(1):887-890, Sep. 1996.

(Continued)

*Primary Examiner*—Nicholas Ponomarenko
*Assistant Examiner*—Iraj A Mohandesi
(74) *Attorney, Agent, or Firm*—Seed Intellectual Property Law Group PLLC

(57) ABSTRACT

The invention relates to a regenerative energy system comprising a first energy producer and a second energy producer. The object of the invention is to improve the environmental compatibility of electrical island networks. There is disclosed a regenerative energy system comprising a first energy producer whose energy production is dependent on the weather and/or the position of the sun, wherein the first energy producer has a generator, by means of which electrical energy is produced, which is fed into an electrical network to which a plurality of consumers are connected, and a second energy producer which has a generator and an internal combustion engine connected thereto, wherein the second energy producer has a tank with fuel which when required can be fed to the internal combustion engine, wherein an installation is adapted to produce the fuel from renewable raw materials and the fuel production installation takes electrical energy for operation thereof from the first energy producer in particular when the first energy producer can produce more electrical energy than the consumers connected to the network consume and/or there is an energy demand from the network to the first energy producer system, which allows the feed of energy to a second energy producer.

16 Claims, 1 Drawing Sheet

U.S. PATENT DOCUMENTS

| | | | | |
|---|---|---|---|---|
| 4,193,005 | A | 3/1980 | Kos et al. | 290/44 |
| 4,236,083 | A | 11/1980 | Kenney | 290/55 |
| 4,423,794 | A | 1/1984 | Beck | 180/165 |
| 5,384,489 | A | 1/1995 | Bellac | |
| 5,973,481 | A * | 10/1999 | Thompson et al. | 322/7 |
| 6,175,217 | B1 | 1/2001 | Da Ponte et al. | 322/19 |
| 6,605,880 | B1 | 8/2003 | Jaunich | 307/80 |
| 6,974,535 | B2 * | 12/2005 | Cody et al. | 208/57 |
| 7,291,937 | B2 * | 11/2007 | Willisch et al. | 290/44 |
| 7,309,930 | B2 * | 12/2007 | Suryanarayanan et al. | 290/55 |
| 2003/0105556 | A1 | 6/2003 | Enis et al. | 700/286 |
| 2005/0225090 | A1 | 10/2005 | Wobben | 290/44 |

FOREIGN PATENT DOCUMENTS

| | | | |
|---|---|---|---|
| DE | 3922573 | | 1/1991 |
| DE | 4232516 | | 3/1993 |
| DE | 197 57 619 | A1 | 7/1999 |
| DE | 20002237 | | 7/2000 |
| DE | 10018943 | | 10/2001 |
| DE | 20113372 | | 1/2002 |
| DE | 201 13 372 | U1 | 2/2002 |
| DE | 10044096 | | 4/2002 |
| DE | 101 57 595 | A1 | 6/2003 |
| DE | 102 10 099 | A1 | 10/2003 |
| EP | 0 046 530 | | 3/1982 |
| GB | 473324 | A | 10/1937 |
| GB | 2 190 554 | | 11/1987 |
| GB | 2 263 734 | A | 8/1993 |
| JP | 56-98342 | | 8/1981 |
| JP | 59124998 | A | 7/1984 |
| JP | 60-259772 | | 12/1985 |
| JP | 10-339259 | | 12/1998 |
| JP | 11-50945 | | 2/1999 |
| JP | 11-69893 | | 3/1999 |
| JP | 2000-73931 | | 3/2000 |
| JP | 2001314038 | A | 11/2001 |
| JP | 2003-184576 | A | 7/2003 |
| JP | 2004508795 | A | 3/2004 |
| WO | 97/45908 | | 12/1997 |

OTHER PUBLICATIONS

Bleijs, J. et al., "A Wind/Diesel System with Flywheel Energy Buffer," in Proceedings of the IEEE/NTUA Athens Power Tech Conference, Athens, Greece, Sep. 5-8, 1993, pp. 995-999.

Castro, G. et al., "Monografias Tecnicas de Energias Renovables," Energia Eolica, pp. 22-39, 1997.

Darrelmann, H., "Alternative Power Storages," in Proceedings of TELESCON 97, Budapest, Hungary, Apr. 22-24, 1997, pp. 33-40.

de Zeuuw, W.J. et al., "On the Components of a Wind Turbine Autonomous Energy System," in Proceedings of the International Conference on Electrical Machines, Lausanne, Switzerland, Sep. 18-21, 1984, pp. 193-196.

Dörge, G., "Neugestaltung der Energieversorgung auf Helgoland," In: de / der Elektromeister-deutsches electrohandwerk, pp. 1701-1704, 1986.

Kabouris, J. et al., "Computational Environment to Investigate Wind Integration into Small Autonomous Systems," Renewable-Energy 18(1):61-75, 1999.

Schempp E. et al., "Systems Considerations in Capacitive Energy Storage," in Proceedings of the Energy Conversion Engineering Conference, New York, Aug. 11-16, 1996, pp. 666-671.

Sinha, A., "Modelling the Economics of Combined Wind/Hydro/Diesel Power Systems," Energy Conversion Management 34(7):577-585, 1993.

Snyman, D. et al., "Analysis and Experimental Evaluation of a New MPPT Converter Topology for PV Installations," in Proceedings of the International Conference on Industrial Electronics, Control, Instrumentation and Automation, New York, Nov. 9-13, 1992, pp. 542-547.

Wichert, B., "PV-Diesel Hybrid Energy Systems for Remote Area Power Generation—A Review of Current Practice and Future Developments," Renewable and Sustainable Energy Reviews, 1(3):209-228, 1997.

Ackermann, T. *Wind Power in Power Systems*. West Sussex: John Wiley & Sons, Ltd., 2005. 302-307.

Hau, E. *Windturbines: Fundamentals, Technologies, Application and Economics*. Munic: Springer, 2000. 322-323.

Heier, S. *Grid Integration of Wind Energy Conversion Systems*. West Sussex: John Wiley & Sons Ltd., 1998. 268-272.

Wolfgang, Löser, "Mein energieautarker Bauernhof" Neue Argumente, 'Online! Bd. 98, Oct. 31, 2003, XP002357262, Gefunden im Internet: URL:http://www.arge-ja.at/loeser.html#oben> gefunden am Dec. 1, 2005! das ganze Dokument.

Anonym: "Projekte: antragslage" 'Online! Jun. 16, 2004, Seite 1, XP002357263 Gefunden im Internet: URL:http://web.archive.org/web/20040324211436/www.offshore-wind.de/show_article.cfm?Id=330> gefunden am Dec. 2, 2005! das ganze Dokument.

* cited by examiner

REGENERATIVE ENERGY SYSTEM

BACKGROUND OF THE INVENTION

1. Field of the Invention

The invention relates to a regenerative energy system comprising a first energy producer and a second energy producer.

2. Description of the Related Art

Basically electrical island networks are admittedly already known, in which, as in DE 100 44 096.7 or 102 10 099.3, a regenerative energy producer, for example a wind park, is provided, and there is also an internal combustion engine as a second energy producer, but there the internal combustion engine takes its fuel from an external source, for example from normal diesel production in which for example petroleum or diesel is produced from a fossil fuel.

As further state of the art attention is directed at this juncture generally to the following publications: DE 201 13 372 U1, DE 197 57 619 A1 and to the work by Wolfgang Löser 'Erster energieautarker Bauernhof in Österreich'.

BRIEF SUMMARY OF THE INVENTION

One object of the invention is to improve the environmental compatibility of electrical island networks.

That object is attained by a regenerative energy system having a first and a second energy producer as set forth in the claims appended hereto.

In contrast to the previously proposed solutions, the invention proposes a regenerative energy system which takes the energy for operation either directly from nature, that is to say it uses the wind or the sun, and processes agriculturally renewable raw materials, for example rape, hemp, sunflower, preferably respective indigenous kinds of oil plants or the like, in order in that way to obtain a suitable fuel, for example rape seed oil, linseed oil, sunflower oil, ethanol from corn or sugar producing plants, biogas or the like, which is consumed by the internal combustion engine and by means of which the internal combustion engine if required then drives a generator so that electrical energy can be fed into the network when more energy is required by the network than can be produced and delivered by the first energy producer.

As both the first energy producer and also the second energy producer are fed from regenerative energy sources, it is possible for the first time to talk of a true regenerative energy system which in addition also has the particular advantage that the raw material for the second energy producer, that is to say for example rape, can be cultivated in the area around the first energy producer, that is to say on the surrounding agricultural surfaces, and thus the transport distances and energy costs for providing the raw material for the second energy producer are extremely low.

If the installation for processing the renewable raw material for the fuel is a rape mill, that requires electrical energy for example for pressing and extracting the rape seed oil from the rape seeds in order for example to operate the rape press and possibly pumps or the conveyor devices or other units or the like. The electrical energy for that purpose is either taken from the network or directly from the first energy producer so that it then produces electrical energy which is not available to the other consumers in the network itself.

It is precisely at times of a low load in a network, for example during the nighttime hours, with at the same time high wind speeds, that the situation can involve an over-provision of regenerative, namely wind energy. If that is then used for operating the presses, oil production is always still effected with regenerative energy in spite of the energy taken from the network. Accordingly the over-provision of wind energy can also be used in an extremely appropriate fashion both from the point of view of the operator and also in environmentally friendly terms.

The provision of the regenerative energy system according to the invention in an island network is particularly preferred so that the electrical energy production, with a maximum possible proportion thereof, corresponds to all demands of regenerative energy production and a particular advantage in that respect is that such production also complies with the provisions of the German REL (Renewable Energy Law) and thus all electrical energy which is fed into the network can also be paid for in accordance with the REL.

BRIEF DESCRIPTION OF THE SEVERAL VIEWS OF THE DRAWING

The invention is described hereinafter by means of an embodiment illustrated in FIG. 1.

DETAILED DESCRIPTION OF THE INVENTION

Figure 1:
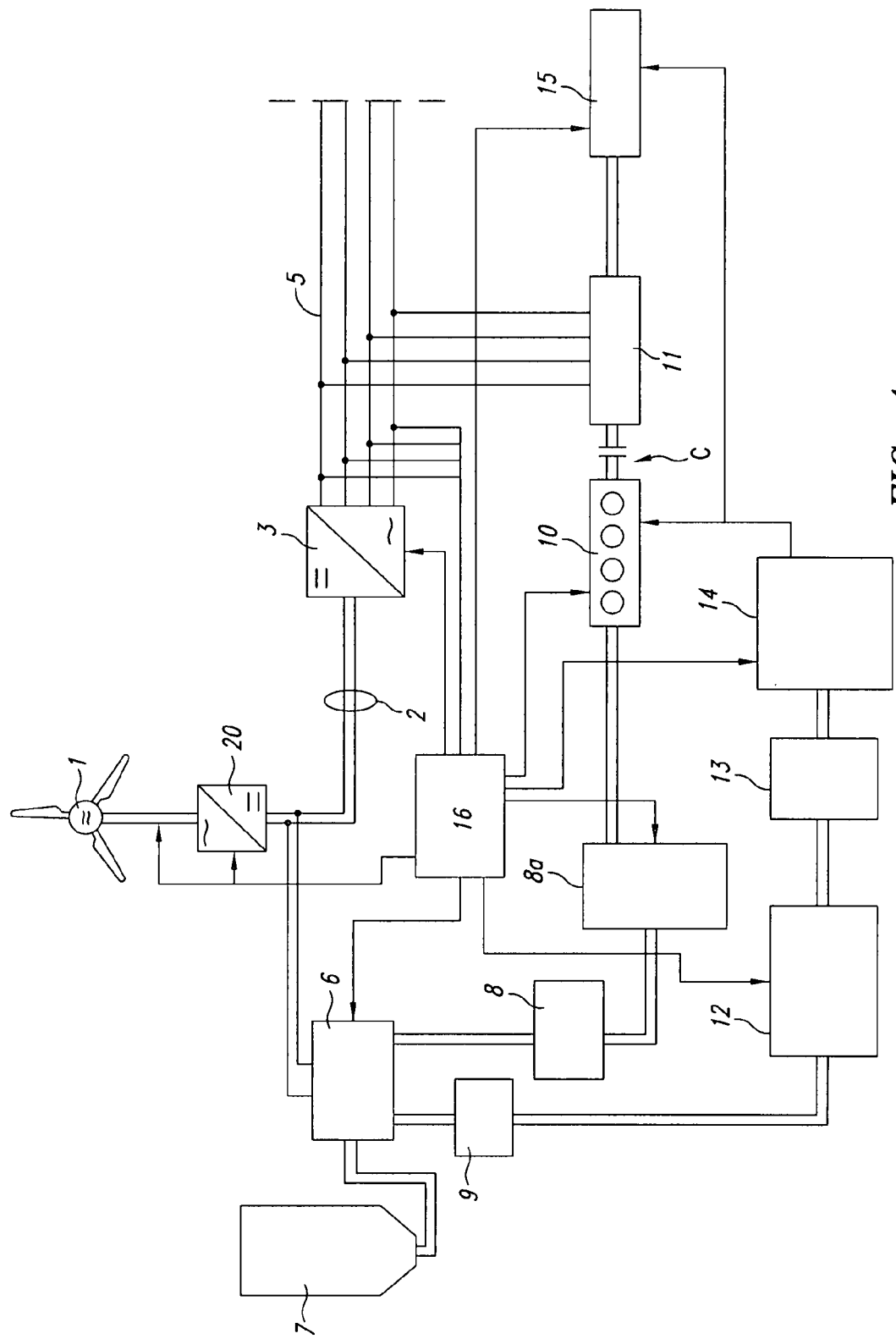

FIG. 1 shows as a first energy producer 1 a wind power installation which can also be representative of an entire wind park. The individual component parts of the wind power installation are not further described herein. The energy produced by the generator (not shown) of the wind power installation is rectified with a rectifier (20) and fed into a DC bus 2 (DC intermediate circuit) which is terminated at its output with a converter device 3 which converts the direct current into an alternating current (three-phase current) and that alternating current is fed into the network 5 by a transformer (not shown).

In addition a mill 6 is in the form of an installation for processing renewable raw materials originating from agricultural production. The mill 6 takes the electrical energy for its own operation from the producer line of the wind power installation 1 and thus directly from the wind power installation 1 or from the network 5.

The mill has a silo 7 in which harvested agricultural product are disposed. In one example, the product is rape, in another it is corn, within others it includes sugar cane, sugar beats or any other agricultural product. Turning now to the example of rape in the rape silo 7 is fed when required to a rape press in the rape mill 6 so that in operation of the rape press rape seed oil 8 on the one hand and rape waste 9 on the other hand is produced. The rape seed oil 8 if required can be filtered or cleaned (filter and cleaning stage are not shown) and can then be fed directly to an internal combustion engine 10 so that the engine 10 is operated with rape seed oil. The engine is coupled to a generator 11 which is driven by the engine 10 (if necessary a clutch C can also be provided between the engine and the generator) so that electrical energy can also be fed into the network 5 directly or by way of a feed into the DC intermediate circuit.

The rape waste 9 can be automatically fed to a biogas installation 12 which produces biogas 13 from the rape waste—and if necessary other biological degradation products in agriculture, for example liquid manure, dung or the like. That biogas can be accommodated by a tank 14 and can be fed from that tank directly either to the first engine 10 or a further internal combustion engine 14, wherein that further engine 14 can either be coupled to its own generator (not shown) or to the generator 11 in order also to drive the latter in order then to produce electrical energy which is fed to the network, by way of the biogas operation alone or together with combustion of the rape seed oil.

A large number of variants of the invention is possible and preferably the rape seed oil tank or the biogas tank is so designed that electrical energy can constantly be afforded for the network, with the highest possible level of certainty, more specifically even when the wind power installations cannot produce energy for a prolonged period of time, due to a feeble wind. At any event the fuel reserves for the rape seed oil and/or biogas should be so designed that network operation is certainly to be possible over 7 to 14 days even without the first energy producer 1.

Insofar as the foregoing description refers to a rape mill, it should be pointed out that naturally other agricultural cultivatable and renewable raw materials can also be used such as for example linseed (hemp), sunflower seeds or other oil-bearing agricultural crops, wherein those crops usually also have a shell which in turn can be fed as waste to a biogas installation.

In regard to the design of the regenerative energy system according to the invention the rated power output of the second energy producer is at least approximately in the region of from 10 to 40% of the rated power output of the first energy producer, preferably approximately in the region of from 20 to 35% of the rated power output of the energy producer and at a maximum in the region of the rated power output of the first energy producer.

The rated power output of the first energy producer is approximately in the range between 50 and 250 MW (or above), preferably approximately in the range of 80 to 150 MW (or below). In the case of a single wind power installation the rated power output can also be in the range of some hundred kW to some MW.

It will be appreciated that it is also possible for the further electrical interim storage means described and disclosed in above-mentioned patent applications DE 100 44 096.7 and 102 10 099.3 to be also incorporated into the energy supply system, that is to say for example for chemical or electrical or mechanical interim storage means to be connected to the DC intermediate circuit in such a way that if necessary it is also possible to have recourse to the energy stored in those storage means in order on the one hand to be able to implement a sufficient feed of energy into the network or on the other hand also to operate the rape mill.

Furthermore it is possible not only for the rape seed oil alone to be fed to an internal combustion engine as described, but additionally thereto or also purely as an alternative thereto, it is possible to feed the biogas produced to the internal combustion engine. If only the biogas is fed to the internal combustion engine and thus used for electrical energy production, the rape seed oil produced can be further used separately, for example fed to a biodiesel production. On the other hand, when preferably the rape seed oil is used for the internal combustion engine and thus for electrical energy production, the biogas produced can also be fed to a thermal power coupling in order for example to supply houses or agricultural production installations with heat.

As is also shown in FIG. 1, there is also a control 16, by means of which the individual parts of the overall energy system can be appropriately controlled. The control can also detect the consumption in the network and if necessary, by way of control of the inverter, feed the desired components of reactive power into the network. In addition, by monitoring the network consumption on the one hand and also the producer capacity of the first energy producer 1 on the other hand, decisions can also be taken by the control system as to the extent to which production by way of the internal combustion engine, that is to say the second energy producer, is switched on, and/or the rape press is set in operation, in order in particular when the producer power of the first energy producer is greater than the consumption in the network, to feed that 'excess' producer output power to the rape mill and thus also to have a further greater controlled consumption on the entire consumer side, that is to say also the consumer network, wherein that controlled consumer, that is to say the rape mill and the units connected thereto, are not just passive consumers but are also capable of producing fuel themselves which then if necessary is in turn converted into energy in the internal combustion engines, which energy can then be fed to the network by the generator 11.

The control 16 can also decide whether 'excess' electrical energy on the producer side is consumed straightaway in the rape mill or is firstly put into intermediate storage in other electrical storage means provided, for example the electro-chemical storage means, electrical storage means (capacitors) or mechanical storage means (flywheels), which is appropriate in particular when the 'excess' amount on the producer side is only somewhat above that which is required on the consumer side. The control system can also provide that, when the rape mill is in operation and then the consumption in the network rises, firstly energy from the intermediate storage means is also used to continue to keep the rape mill running in order in that way to prevent a possibly short-term shut-down of the rape mill.

Furthermore the control system can provide that, when larger consumers connected to the network signal a current and/or future consumption (energy demand) (that can also be done by electronic control signals which are transmitted over the network to the energy producer system according to the invention), the internal combustion engines are brought into operation in good time in order to anticipate a possible network problem due to the greatly increasing consumption.

The control system also ensures that overall documentation about the start-up of the individual installations and parts of the entire regenerative energy system is implemented and in particular the control system can provide that, upon the failure of individual components, for example a wind power installation because of maintenance, other parts of the installation, for example internal combustion engines, 'replace' those failed parts of the installation so that on the consumer side the failure of a subsystem does not lead to network problems.

The invention further includes the following attractive alternative:

A regenerative energy system comprising:
a first energy producer whose energy production is dependent on the weather and/or the position of the sun, wherein the first energy producer has a generator, by means of which electrical energy is produced, which is fed into an electrical network to which a plurality of consumers are connected, and
a second energy producer which has a generator and an internal combustion engine connected thereto, wherein the second energy producer has a tank with fuel which when required can be fed to the internal combustion engine, wherein an installation is adapted to produce the fuel from renewable raw materials and said fuel production installation is electrically directly connected to the first energy producer, wherein the connection is preferably given to a DC voltage intermediate circuit of the energy system and/or a part of the first energy producer in which there is an AC voltage at the output side, and that the fuel production installation takes electrical energy for operation thereof from the first energy producer in particular when a) the current power of the first energy producer exceeds a given value, for example more than 60-80% of the rated power output of the first energy producer and/or b) the first energy producer can produce more electrical energy than the consumers connected to the network consume and/or c) the fuel in the tank of the second energy producer falls below a given filling level, for example less than 20% of the reference filling level and/or d) the second energy producer has a given consumption of fuel, for example X liters per hour.

The Figure shows that the rape mill 6 is electrically connected to the DC voltage intermediate circuit at the output side of the rectifier 20. It will be appreciated that that electrical connection can also be effected by the first energy producer by the connection being at the output side of the inverter 3 or the output side of the generator 1, that is to say the electrical connection is to part of the first energy producer in which AC voltage is carried.

A particular advantage in this respect is that the energy made available by the first energy producer for the rape mill does not at all first pass into the network and is thus also not paid for at the network side, as however the network remunerations are generally less than the costs which must be incurred to purchase current from the network, this solution is also economically particularly advantageous.

Even if this is not shown, it should also be pointed out that the rape seed oil produced is usually filtered a plurality of times in order to assume a high level of purity and that in particular also the electrical energy for such filters and cleaning stages can be branched directly from the first energy producer system.

Finally it should also be pointed out that in particular the rape seed oil tank can also have a fuelling point so that the operator of the overall system can also use that rape seed oil himself, for example in a tractor or truck or can also sell or dispose of it in some other fashion.

A further advantageous configuration of the invention can also provide that the rape mill or rape press, that is to say the device for producing the oil, is in the form of a mobile device, for example a fixed installation on a vehicle, for example a truck or the like. That has the advantage that then if necessary such a rape press can also be introduced into the regenerative energy system according to the invention when oil is to be produced and when sufficient oil has been produced and that oil is in the tank or the rape supplies, that is to say the supplies from which only oil from agricultural production can be obtained at all, are exhausted, the mobile rape press can be incorporated into another regenerative energy system according to the invention. That solution has the advantage that a rape press does not have to be fixedly provided for each regenerative energy system according to the invention, but a mobile rape press can also be successively incorporated at various regenerative energy systems, which makes the capital investment in such a rape press appear considerably more worthwhile. It will be appreciated that such a mobile rape press then also has all electrical connections in order also to be able to be electrically incorporated into the regenerative energy system according to the invention as described hereinbefore.

Insofar as a mobile rape press is not yet known, the subject-matter of the present application is also such a mobile rape press as such. This involves a rape press which either can be electrically operated and takes the electrical energy for operation thereof from the first energy system and/or the vehicle has a generator or drive with which the press can be operated so that this mobile rape press can be used everywhere even if the connection to a first regenerative energy system is not available. The generator or drive on the vehicle can again be driven by an engine which in turn uses diesel or also rape seed oil itself.

Preferably such a vehicle with a press also has the filter device for filtering the extracted rape seed oil.

It should also be mentioned once again that rape seed oil in the present application stands not only for rape seed oil alone as such but also represents any other oil which can be produced from agricultural production, for example sunflower oil or the like.

The mobile rape press can be carried by a vehicle trailer. Then not just a part of the press can be mounted on that vehicle trailer, but also if necessary the further parts for filtering or further treating the extracted rape seed oil. For the energy supply for the rape press—as described above—it can be provided that the press is supplied with electrical energy by way of an electrical connection. Additionally or alternatively thereto it can also be provided that a diesel generator or diesel drive is mounted on the trailer, which provides the energy necessary for the press, whether it is in the form of current or whether it is driven by way of a direct drive by a diesel engine on the press. A further possibility in regard to the drive for the press can also provide that the press itself has a power take-off connection or the like which can be connected to the drive of a tractor, for example to the power take-off drive shaft thereof, so that the press can then be driven to extract the rape seed oil by means of an agricultural vehicle, that is to say for example a tractor. If the rape press is provided With such a connection for a power take-off drive of a tractor, it is also particularly advantageous if a power take-off shaft linkage of appropriate length is also provided on the vehicle so that the tractor only has to drive up to the press and can then be connected to the press itself by way of the power take-off shaft linkage.

A particularly advantageous configuration of the invention then involves a mobile device for the extraction of fuel, for example oil, from agricultural materials such as for example rape or sunflower seeds, wherein the rape press is mounted on a mobile base, for example a vehicle or a vehicle trailer, and if necessary is fixed thereto, wherein provided for the rape press is a drive which is either arranged together with the rape press on the vehicle and/or the drive for the rape press is provided separately from the vehicle and such an external drive can be connected to the rape press by way of a suitable connection, for example a power take-off shaft connection. Such a mobile rape press according to the invention also has the connections for receiving or accepting pressed material and finally also a first discharge for the extracted oils or a further discharge for the pressing waste, for example rape waste. The trailer of the press can also be equipped with a tank for receiving the extracted oil. It is however also possible to provide a further trailer to which the extracted oil is fed, in a tank mounted thereon. It is however also possible for the extracted oil to be pumped directly into a stationary tank, and then it can be fed from that tank to the second regenerative energy system.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A regenerative energy system comprising:
a first energy producer whose energy production is dependent on weather and/or a position of a sun, wherein the first energy producer has a generator configured to produce electrical energy, which is fed into an electrical network to which a plurality of consumers are connected,
a second energy producer which has a generator and an internal combustion engine connected thereto, wherein the second energy producer has a tank with fuel which when required is fed to the internal combustion engine, and
an installation adapted to produce the fuel from renewable raw materials and the installation takes electrical energy for operation thereof from the first energy producer when the first energy producer produces more electrical energy than the consumers connected to the network consume and/or there is an energy demand from the network to the first energy producer system,
wherein the installation adapted to produce fuel from renewable raw materials is a fuel production mill which manufactures the fuel from agricultural material.

2. A regenerative energy system according to claim 1 wherein fuel is fed to a second internal combustion engine and electrical energy is fed into the network when the first energy producer produces less electrical energy than is consumed in the network.

3. A regenerative energy system according to claim 1 wherein the first energy producer is an individual wind power installation or a wind park and/or a photovoltaic installation.

4. A regenerative energy system according to claim 1 wherein the installation adapted to produce fuel from renewable raw materials is a rape oil mill adapted to manufactured rape oil and/or waste from raw material.

5. A regenerative energy system according to claim 4 wherein the oil, prior to being fed to the internal combustion engine, passes through a cleaning stage and is mixed with methanol in order to obtain oil methyl ester which is stored in tank.

6. A regenerative energy system according to claim 4 wherein the waste is fed to a biogas installation adapted to process the waste and produce biogas therefrom and the biogas produced is fed alone or together with the oil or biodiesel together to an internal combustion engine which also drives a generator connected thereto.

7. A regenerative energy system according to claim 4 wherein the installation is adapted to produce the fuel from renewable raw materials that include rape, hemp, sunflowers and/or linseed.

8. A regenerative energy system according to claim 1 wherein the second energy producer has a rated power output which is in a range of 10 to 40% of a rated power output of the first energy producer.

9. A regenerative energy system according to claim 1 wherein a rated power output of the first energy producer is in the region of 50 to 250 MW.

10. A regenerative energy system according to claim 1 further comprising a control device configured to control and monitor individual subsystems of the regenerative energy system and to also monitor consumption at the electrical network, and in dependence on monitoring of the consumption in the network and the energy produced controls the individual subsystems in such a way that as much as possible of the energy which is produced by the first energy producer can be is usable for the entire system.

11. An electrical island network having the regenerative energy system according to claim 1 on a producer side.

12. A regenerative energy system comprising:
a first energy producer whose energy production is dependent on weather and/or a position of a sun, wherein the first energy producer has a generator configured to produce electrical energy, which is fed into an electrical network to which a plurality of consumers are connected,
a second energy producer which has a generator and an internal combustion engine connected thereto, wherein the second energy producer has a tank with fuel which when required is fed to the internal combustion engine, and
a fuel production installation adapted to produce the fuel from renewable raw materials and said fuel production installation is electrically directly connected to the first energy producer by a DC voltage intermediate circuit of the energy system and/or a part of the first energy producer in which there is an AC voltage at an output side, and wherein the fuel production installation takes electrical energy for operation thereof from the first energy producer when
  a) current power of the first energy producer exceeds a given value, and/or
  b) the first energy producer produces more electrical energy than the consumers connected to the network consume, and/or
  c) the fuel in the tank of the second energy producer falls below a given filling level, and/or
  d) the second energy producer has a given consumption of fuel.

13. The regenerative energy system according to claim 12, wherein the fuel production installation is configured to take electrical energy for operation from the first energy producer when the current power of the first energy producer exceeds 60% of a rated power output of the first energy producer and/or the fuel in the tank of the second energy producer falls below 20% of a reference filling level.

14. The regenerative energy system according to claim 1, wherein the second energy producer has a rated power output which is a range of 20% to 35% of a rated power output of the first energy producer.

15. The regenerative energy system according to claim 1, wherein a rated power output of the first energy producer is in a range of 80 MW to 150 MW.

16. The regenerative energy system according to claim 1, wherein the installation is configured such that energy is fed to the second producer when the first energy producer produces more electrical energy than the consumers to the network consume and/or there is an energy demand from the network to the first energy producer system.

* * * * *